(12) United States Patent
Takei et al.

(10) Patent No.: US 9,766,374 B2
(45) Date of Patent: Sep. 19, 2017

(54) OPTICAL MEMBER, IMAGE PICKUP APPARATUS, AND METHOD FOR MANUFACTURING OPTICAL MEMBER

(71) Applicant: CANON KABUSHIKI KAISHA, Tokyo (JP)

(72) Inventors: Akiko Takei, Fujisawa (JP); Zuyi Zhang, Yokohama (JP); Yoshinori Kotani, Yokohama (JP); Akira Sugiyama, Yokohama (JP); Kenji Takashima, Tokyo (JP); Naoyuki Koketsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 14/402,883

(22) PCT Filed: May 10, 2013

(86) PCT No.: PCT/JP2013/003011
§ 371 (c)(1),
(2) Date: Nov. 21, 2014

(87) PCT Pub. No.: WO2013/175724
PCT Pub. Date: Nov. 28, 2013

(65) Prior Publication Data
US 2015/0146074 A1 May 28, 2015

(30) Foreign Application Priority Data

May 23, 2012 (JP) ................................. 2012-117484

(51) Int. Cl.
*C03C 11/00* (2006.01)
*C03C 15/00* (2006.01)
(Continued)

(52) U.S. Cl.
CPC ................ *G02B 1/11* (2013.01); *C03B 20/00* (2013.01); *C03B 32/00* (2013.01); *C03C 15/00* (2013.01);
(Continued)

(58) Field of Classification Search
None
See application file for complete search history.

(56) References Cited

U.S. PATENT DOCUMENTS 4,225,330 A * 9/1980 Kakuzen ............... C03B 37/014
65/17.4
8,993,107 B2 * 3/2015 Kotani .................... C03C 3/091
428/215

(Continued)

FOREIGN PATENT DOCUMENTS

JP S61256942 A 11/1986
JP 64-083583 A 3/1989
(Continued)

OTHER PUBLICATIONS

Minot, Michael Jay, "Single-layer, gradient refractive index antireflection films effective from 0.35 to 2.5 μ", J. Opt. Soc. Am., Jun. 1976, pp. 515-519, vol. 66, No. 6.

*Primary Examiner* — David Sample
(74) *Attorney, Agent, or Firm* — Canon U.S.A. Inc., IP Division

(57) ABSTRACT

An optical member including a porous glass layer on a base member is provided, wherein the reflectance is reduced and a ripple is suppressed.
The optical member is provided with a base member and a glass layer holding a transparent material in the inside of a porous structure disposed on the base member, wherein in the thickness direction of the glass layer, the porosity in the base member side with respect to the center line of the glass layer in the thickness direction is smaller than the porosity in the side opposite to the base member with respect to the center line of the glass layer in the thickness direction.

10 Claims, 7 Drawing Sheets

(51) Int. Cl.

| | | |
|---|---|---|
| *C03C 17/32* | (2006.01) | |
| *C03C 17/42* | (2006.01) | |
| *G02B 1/11* | (2015.01) | |
| *G02B 1/118* | (2015.01) | |
| *G02B 1/12* | (2006.01) | |
| *C03B 20/00* | (2006.01) | |
| *C03B 32/00* | (2006.01) | |
| *C03C 17/02* | (2006.01) | |

(52) U.S. Cl.
CPC .............. *C03C 17/02* (2013.01); *C03C 17/42* (2013.01); *G02B 1/118* (2013.01); *G02B 1/12* (2013.01); *C03C 2217/425* (2013.01); *C03C 2218/11* (2013.01); *C03C 2218/31* (2013.01); *C03C 2218/33* (2013.01); *Y10T 428/249961* (2015.04)

(56) References Cited

U.S. PATENT DOCUMENTS

| | | | |
|---|---|---|---|
| 9,487,536 B2* | 11/2016 | Bommagani | C07D 493/04 |
| 2008/0310019 A1 | 12/2008 | Um | |
| 2011/0151222 A1* | 6/2011 | Oudard | B32B 3/26 |
| | | | 428/216 |
| 2012/0088066 A1* | 4/2012 | Aytug | B82Y 40/00 |
| | | | 428/141 |
| 2013/0194668 A1* | 8/2013 | Liang | C03C 17/22 |
| | | | 359/586 |
| 2013/0194670 A1* | 8/2013 | Liang | B05D 5/063 |
| | | | 359/601 |
| 2013/0215513 A1* | 8/2013 | Liang | G02B 1/11 |
| | | | 359/601 |

FOREIGN PATENT DOCUMENTS

| | | | | |
|---|---|---|---|---|
| JP | 10-059742 A | 3/1998 | | |
| JP | 2006215542 A | 8/2006 | | |
| JP | 2011505267 A | 2/2011 | | |
| JP | WO 2012029261 A2 * | 3/2012 | ............. | C03C 3/091 |
| JP | 2012072048 A | 4/2012 | | |
| KR | WO 2013187735 A1 * | 12/2013 | ......... | H01L 51/5268 |
| WO | 2007/031317 A2 | 3/2007 | | |
| WO | 2009/062140 A2 | 5/2009 | | |
| WO | 2010/042951 A2 | 4/2010 | | |
| WO | 2012/054680 A1 | 4/2012 | | |
| WO | 2012/141875 A1 | 10/2012 | | |
| WO | 2013/088632 A1 | 6/2013 | | |

* cited by examiner

[Fig. 1]
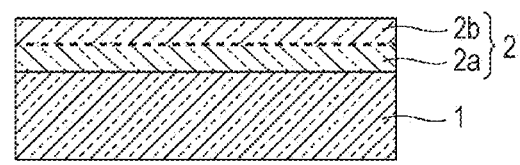
[Fig. 2]
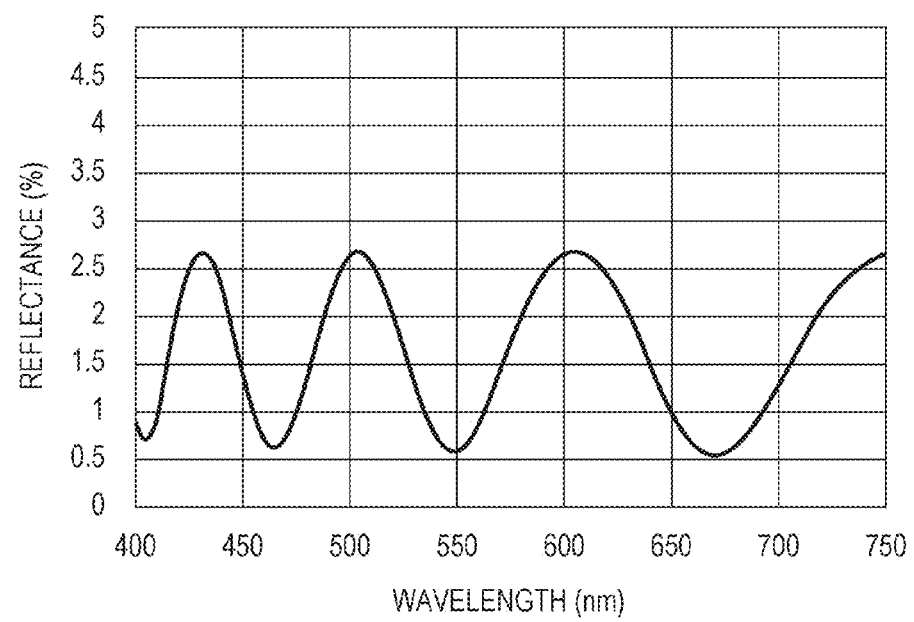
[Fig. 3A]
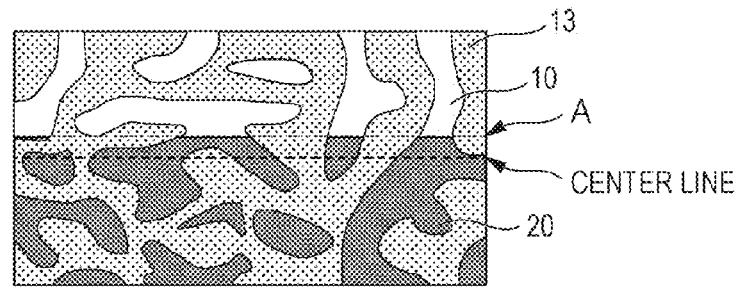

[Fig. 3B]
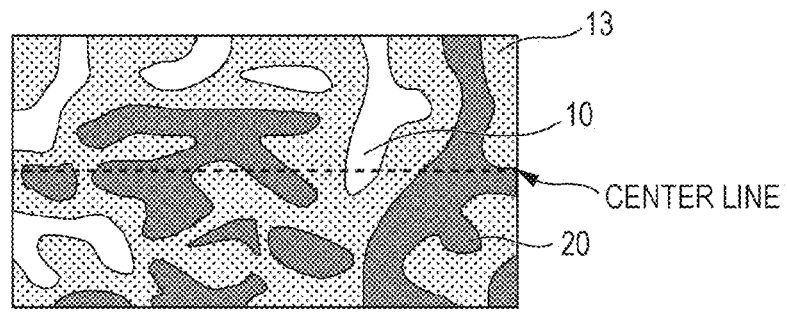
[Fig. 3C]
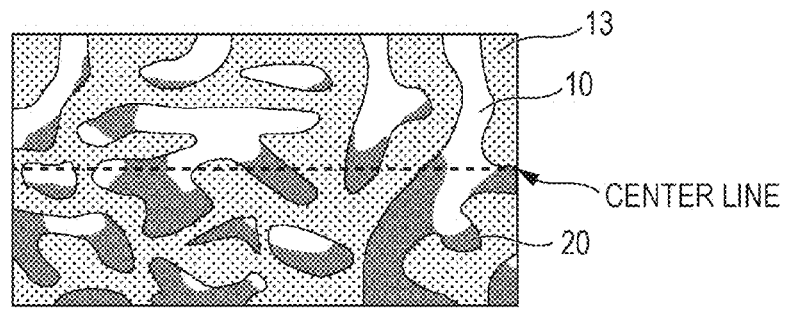
[Fig. 3D]
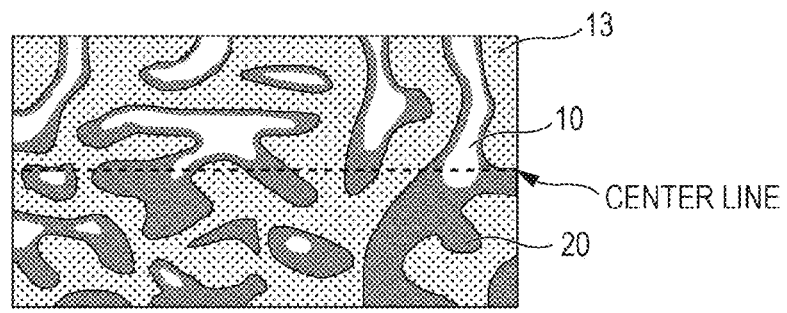

[Fig. 4]
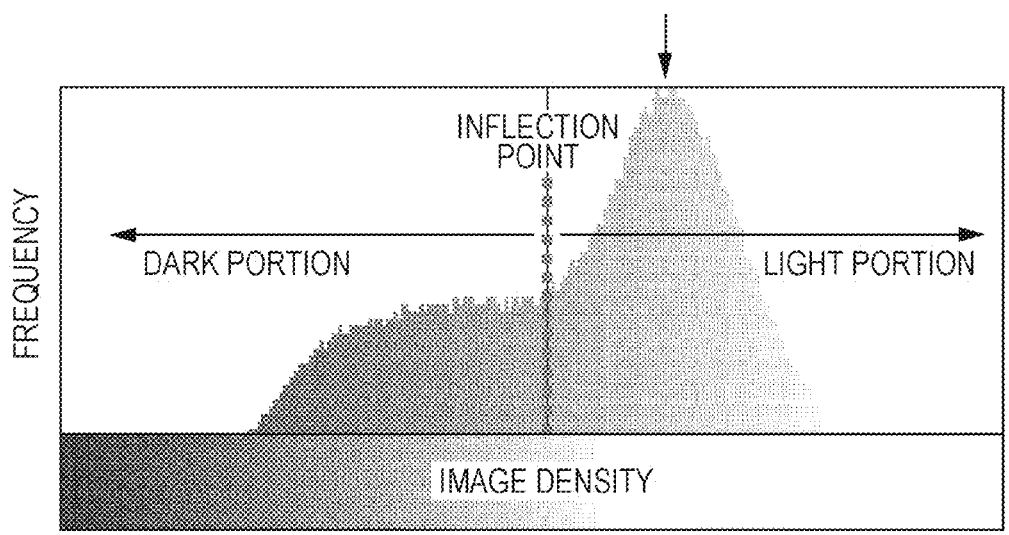
[Fig. 5]
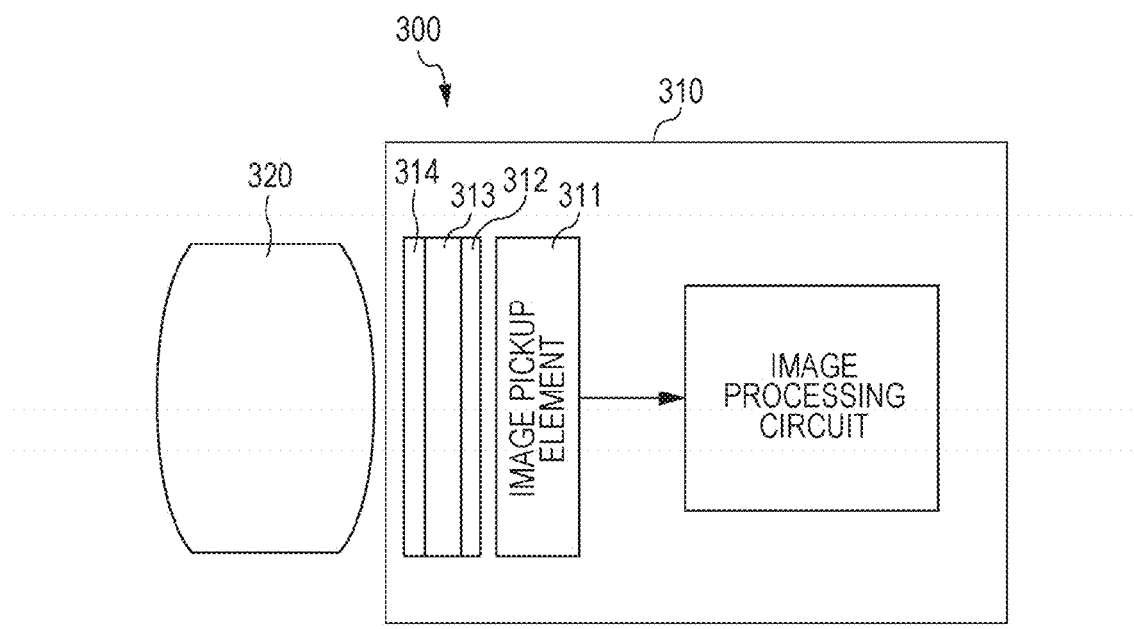

[Fig. 6A]
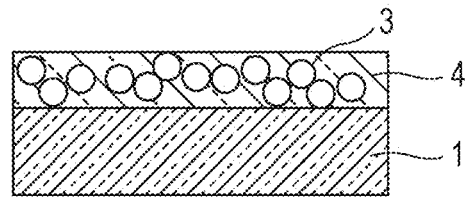
[Fig. 6B]
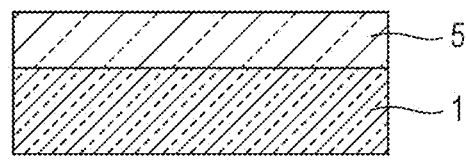
[Fig. 6C]
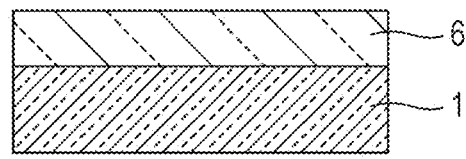
[Fig. 6D]
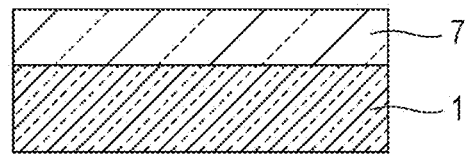
[Fig. 6E]
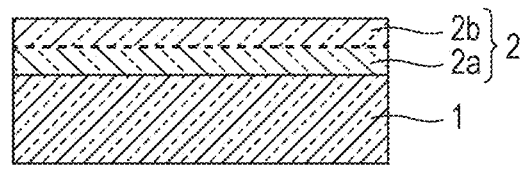

[Fig. 7A]
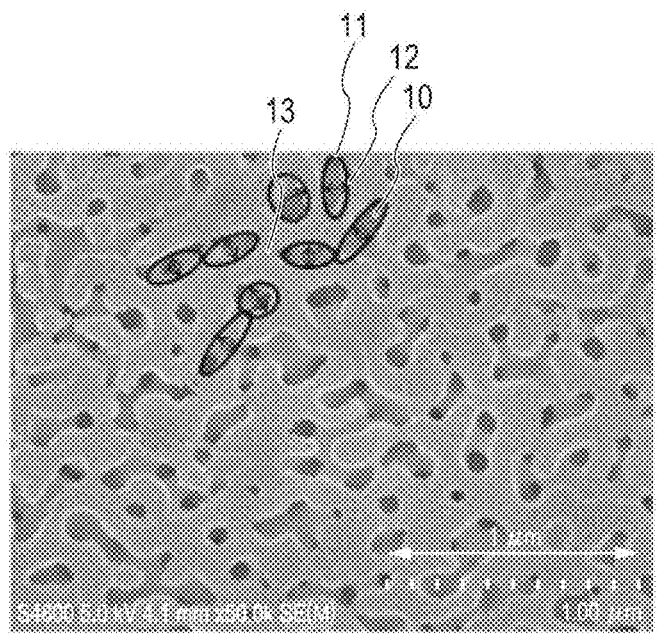
[Fig. 7B]
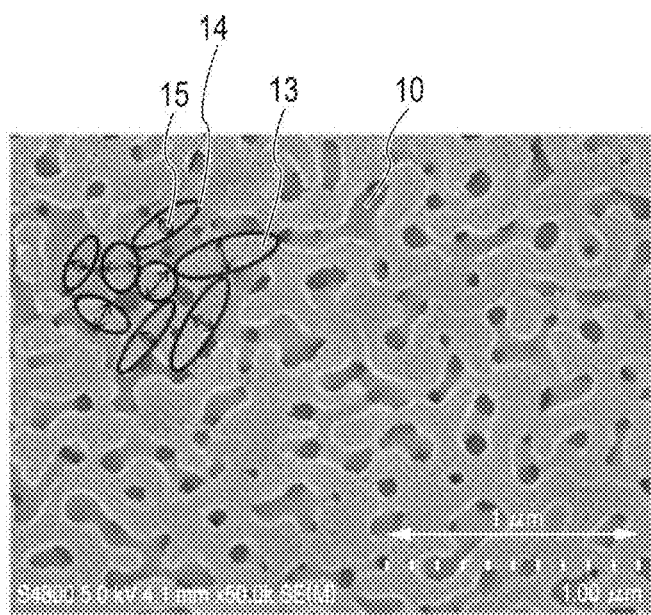

[Fig. 8]
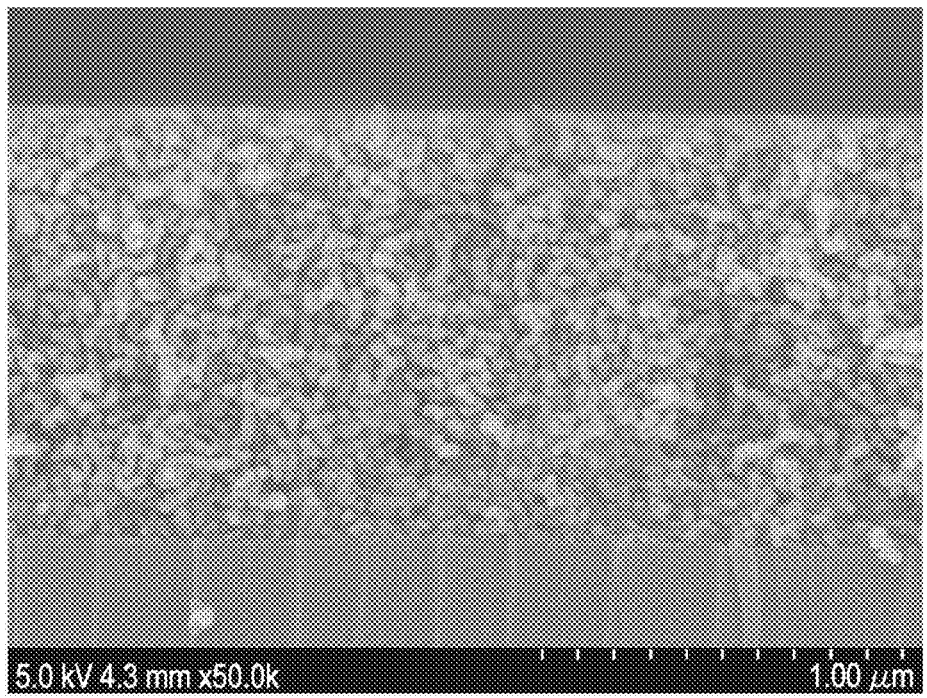
[Fig. 9]
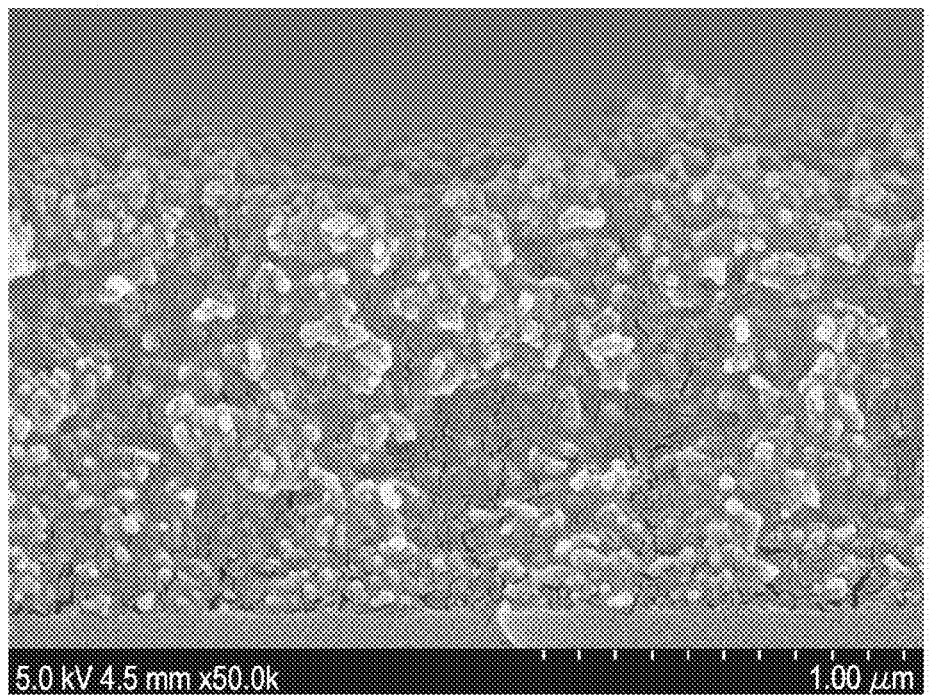

[Fig. 10]
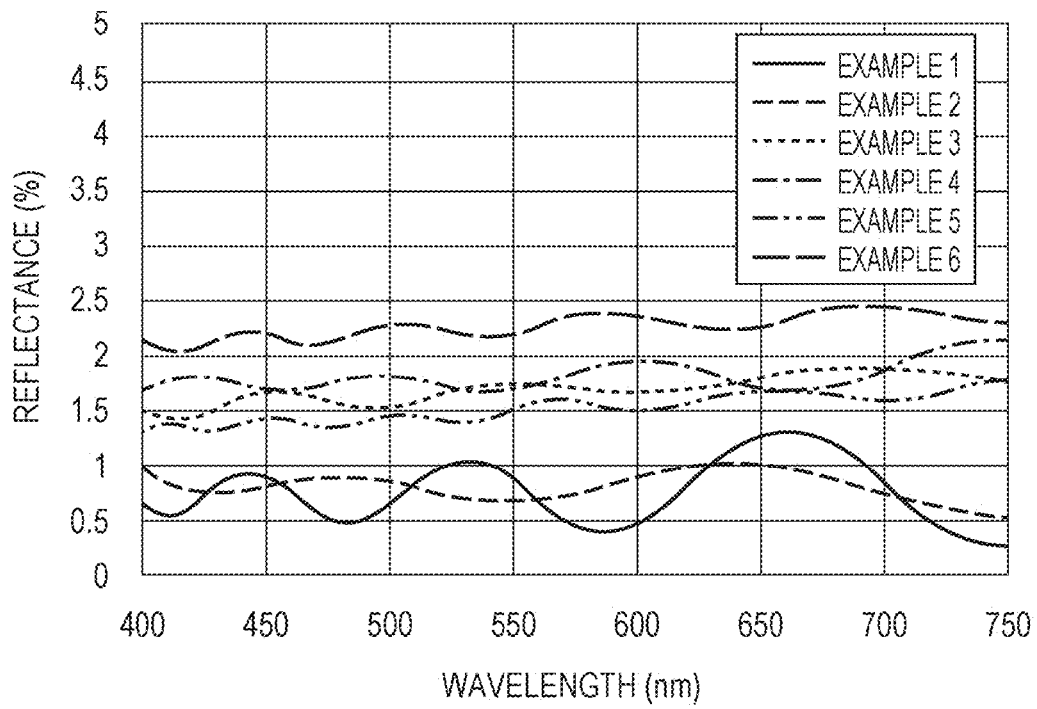
[Fig. 11]
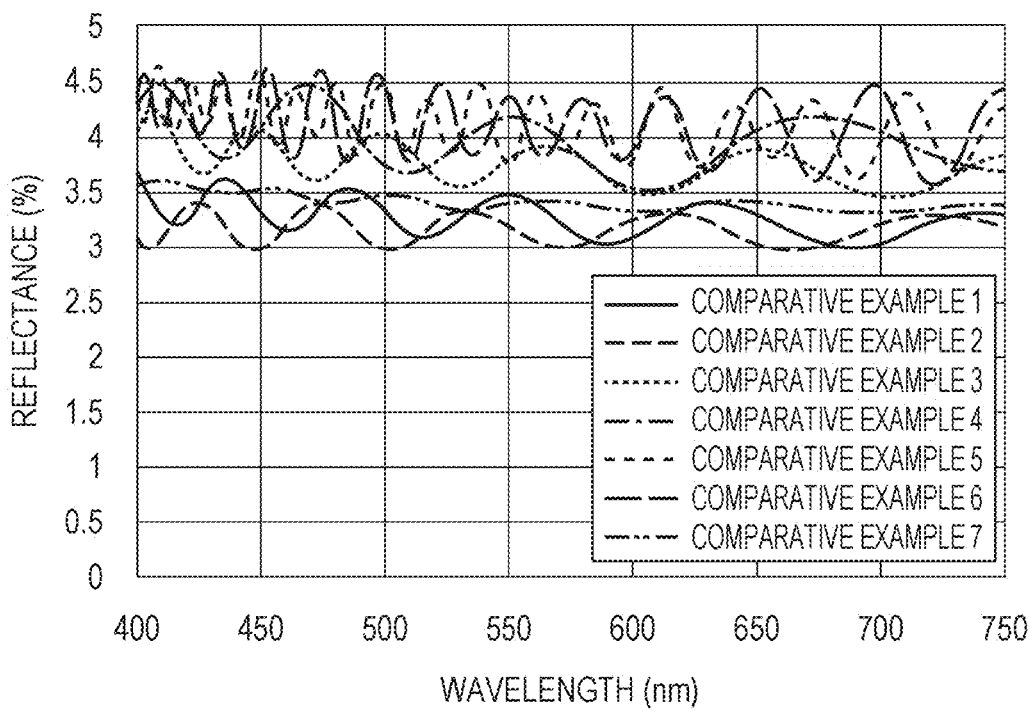

OPTICAL MEMBER, IMAGE PICKUP APPARATUS, AND METHOD FOR MANUFACTURING OPTICAL MEMBER

TECHNICAL FIELD

The present invention relates to an optical member provided with a porous glass layer on a base member, an image pickup apparatus provided with the optical member, and a method for manufacturing the optical member.

BACKGROUND ART

In recent years, the industrial utilization of porous glasses as adsorbing agents, microcarrier supports, separation films, optical members, and the like has been highly anticipated. In particular, porous glasses have a wide utilization range as optical members because of a characteristic of low refractive index.

As for a method for manufacturing a porous glass relatively easily, a method taking advantage of a phase separation phenomenon has been mentioned. A typical example of a base material for the porous glass exhibiting the phase separation phenomenon is borosilicate glass made from silicon oxide, boron oxide, an alkali metal oxide, and the like. In production, the borosilicate glass is heat-treated at a constant temperature to induce phase separation into a silicon oxide rich phase and a non-silicon oxide rich phase (hereafter referred to as a phase separation treatment), and a non-silicon oxide rich phase is eluted with an acid solution (hereafter referred to as an etching treatment), so that the porous glass is produced. The skeleton constituting the thus produced porous glass is primarily silicon oxide. The skeleton diameter, the hole diameter, and the porosity of the porous glass have influences on the reflectance and the refractive index of the light.

NPL 1 discloses a configuration in which the porosity is controlled in etching in such a way that elution of a non-silicon oxide rich phase is allowed to become insufficient partly and, thereby, the refractive index increases from the surface toward the inside. Consequently, reflection at a porous glass surface is reduced.

Meanwhile, PTL 1 discloses a method for forming a porous glass layer on a base member. Specifically, a film containing borosilicate glass (phase-separable glass) is formed on a base member by a printing method, and a porous glass layer is formed on the base member by a phase separation heat treatment and an etching treatment.

In addition, PTL 2 discloses a complex in which a resin is filled in holes in a porous glass.

CITATION LIST

Patent Literature

PTL 1: Japanese Patent Laid-Open No. 01-083583
PTL 2: Japanese Patent Laid-Open No. 10-059742 Non
  Patent Literature
NPL 1: J. Opt. Soc. Am., Vol. 66, No. 6, 1976

SUMMARY OF INVENTION

Technical Problem

In the case where several micrometers of porous glass layer is formed on the base member, as described in PTL 1, when light is incident on the porous glass surface, the light reflected at the porous glass surface interferes with the light reflected at the interface between the base member and the porous glass, so that a ripple (interference fringe) occurs.

In NPL 1, there is no disclosure with respect to the configuration to form the porous glass layer on the base member. Furthermore, according to the method disclosed in NPL1, it is difficult to control the degree of proceeding of etching and, therefore, it is difficult to control the refractive index. In addition, a non-silicon oxide rich phase, which is a soluble component, remains and, thereby, the water resistance is degraded, so that problems, e.g., clouding, in the use as an optical member occur.

Meanwhile, according to the method disclosed in PTL 2, the resin is completely filled in holes of the porous glass. Therefore, reflection at the interface between the air and the porous glass layer filled with the resin increases, so that the suitability for the optical member is poor.

The present invention provides an optical member including a porous glass layer on a base member, wherein the reflectance is reduced and a ripple is suppressed, and provides a method for manufacturing the optical member easily.

Solution to Problem

An optical member according to an aspect of the present invention is provided with a base member and a glass layer holding a transparent material in the inside of a porous structure disposed on the above-described base member, wherein in the thickness direction of the above-described glass layer, the porosity in the above-described base member side with respect to the center line of the above-described glass layer in the above-described thickness direction is smaller than the porosity in the side opposite to the above-described base member with respect to the above-described center line of the above-described glass layer in the above-described thickness direction.

An optical member according to another aspect of the present invention is provided with a base member and a glass layer holding a transparent material in the inside of a porous structure disposed on the above-described base member, wherein in the thickness direction of the above-described glass layer, the content of the above-described transparent material in the above-described base member side with respect to the center line of the above-described glass layer in the above-described thickness direction is larger than the content of the above-described transparent material in the side opposite to the above-described base member with respect to the above-described center line of the above-described glass layer in the above-described thickness direction.

An optical member according to another aspect of the present invention is provided with a base member and a glass layer holding a transparent material in the inside of a porous structure disposed on the above-described base member, wherein in the thickness direction of the above-described glass layer, the content of carbon in the above-described base member side with respect to the center line of the above-described glass layer in the above-described thickness direction is larger than the content of carbon in the side opposite to the above-described base member with respect to the above-described center line of the above-described glass layer in the above-described thickness direction.

A method for manufacturing an optical member, according to another aspect of the present invention, is a method for manufacturing an optical member provided with a base member and a glass layer holding a transparent material in the inside of a porous structure disposed on the above-described base member, the method including the steps of forming a glass powder layer containing a plurality of glass powders on the base member, forming a glass body layer by fusing the above-described plurality of glass powders contained in the above-described glass powder layer, forming a phase-separated glass layer by heating the above-described glass body layer, forming a porous glass layer having three-dimensionally penetrated holes by etching the above-described phase-separated glass layer, and forming a glass layer by allowing the holes in the above-described porous glass layer to hold a transparent material, wherein the above-described forming of a glass layer is a step to allow the holes in the above-described porous glass layer to hold the above-described transparent material in such a way that, in the thickness direction of the above-described glass layer, the porosity in the above-described base member side with respect to the center line of the above-described glass layer in the above-described thickness direction becomes smaller than the porosity in the side opposite to the above-described base member with respect to the above-described center line of the above-described glass layer in the above-described thickness direction.

Advantageous Effects of Invention

According to aspects of the present invention, an optical member including a porous glass layer on a base member, wherein the reflectance is reduced and a ripple is suppressed, and a method for manufacturing the optical member easily can be provided.

BRIEF DESCRIPTION OF DRAWINGS

FIG. 1 is a schematic sectional view showing an example of an optical member according to an aspect of the present invention.

FIG. 2 is a diagram illustrating a ripple.

FIG. 3A is a schematic sectional diagram showing an example of the state of a transparent material in holes in a porous glass layer.

FIG. 3B is a schematic sectional diagram showing an example of the state of a transparent material in holes in a porous glass layer.

FIG. 3C is a schematic sectional diagram showing an example of the state of a transparent material in holes in a porous glass layer.

FIG. 3D is a schematic sectional diagram showing an example of the state of a transparent material in holes in a porous glass layer.

FIG. 4 is a diagram illustrating a porosity.

FIG. 5 is a schematic diagram showing an image pickup apparatus according to an aspect of the present invention.

FIG. 6A is a schematic sectional view illustrating an example of a method for manufacturing an optical member according to an aspect of the present invention.

FIG. 6B is a schematic sectional view illustrating an example of a method for manufacturing an optical member according to an aspect of the present invention.

FIG. 6C is a schematic sectional view illustrating an example of a method for manufacturing an optical member according to an aspect of the present invention.

FIG. 6D is a schematic sectional view illustrating an example of a method for manufacturing an optical member according to an aspect of the present invention.

FIG. 6E is a schematic sectional view illustrating an example of a method for manufacturing an optical member according to an aspect of the present invention.

FIG. 7A is a diagram illustrating an average hole diameter.

FIG. 7B is a diagram illustrating an average skeleton diameter.

FIG. 8 is a SEM image of a cross-section of an optical member produced in Example 1.

FIG. 9 is a SEM image of a cross-section of an optical member produced in Comparative example 3.

FIG. 10 is a diagram showing the wavelength dependence of reflectance of Examples 1 to 6.

FIG. 11 is a diagram showing the wavelength dependence of reflectance of Comparative examples 1 to 7.

DESCRIPTION OF EMBODIMENTS

The present invention will be described below in detail with reference to the embodiments according to the present invention. Well known or publicly known technologies in the related art are adopted for the portions not specifically shown in the drawings and the descriptions in the present specification.

The term "phase separation" that forms a porous structure according to an aspect of the present invention will be described with reference to an example in which borosilicate glass containing silicon oxide, boron oxide, and an oxide having an alkali metal is used as a glass body. The term "phase separation" refers to separation of a phase with a composition of the oxide having an alkali metal and the boron oxide larger than the composition before the phase separation occurs (non-silicon oxide rich phase) from a phase with a composition of the oxide having an alkali metal and the boron oxide smaller than the composition before the phase separation occurs (silicon oxide rich phase) in the inside of glass. The phase-separated glass is subjected to an etching treatment to remove the non-silicon oxide rich phase, so that a porous structure is formed in the glass body.

The phase separation is classified into a spinodal type and a binodal type. A hole of the porous glass obtained by spinodal type phase separation is a through hole connected from the surface to the inside. The through hole may be divided into a plurality of branches or be connected to other holes at some midpoints. More specifically, the structure derived from the spinodal type phase separation is an "ant nest"-shaped structure in which holes are three-dimensionally connected. The skeleton made from silicon oxide is regarded as a "nest" and a through hole is regarded as a "burrow". Meanwhile, a porous glass obtained by binodal type phase separation has a structure in which independent holes, each surrounded by a closed curved surface substantially in the shape of a sphere, are present in the skeleton made from silicon oxide discontinuously. The hole derived from spinodal type phase separation and the hole derived from binodal type phase separation can be determined and distinguished on the basis of the result of observation of their shapes by using an electron microscope. In addition, the spinodal type phase separation and the binodal type phase separation are specified by controlling the composition of the glass body and the temperature in phase separation. The porous structure according to an aspect of the present invention is a porous structure derived from the spinodal type phase separation.

Optical Member

FIG. 1 shows a schematic sectional view of the optical member according to an aspect of the present invention. The optical member according to an aspect of the present invention is provided with a glass layer 2 on a base member 1, the glass layer 2 holding a transparent material in holes in a porous glass layer having a porous structure including three-dimensionally continuous through holes derived from spinodal type phase separation.

In the present invention, the glass layer 2 may be referred to as a transparent material-containing glass layer. The glass layer 2 (transparent material-containing glass layer) is a glass layer holding a transparent material in the inside of the porous structure and, specifically, refers to a glass layer having a configuration in which the transparent material is filled into part of holes of the porous glass layer or a configuration in which the transparent material is not filled into holes but adheres to part of the surfaces of the holes.

The porous glass layer disposed on the base member has a refractive index lower than the refractive index of the base member and is expected to be utilized as an optical member because reflection at the interface between the porous glass layer and the air (surface of the porous glass layer) is suppressed. However, in the optical member provided with the porous glass layer on the base member, a ripple phenomenon occurs, where an interference fringe appears in the reflected light because of an interference effect of the light reflected at the surface of the porous glass layer and the light reflected at the interface between the base member and the porous glass layer. In particular, this interference effect is enhanced and the ripple phenomenon appears considerably in the case where the thickness of the porous glass layer is more than or equal to the wavelength of light and less than or equal to several ten micrometers.

When the reflectance is measured and a graph is prepared while the horizontal axis indicates the wavelength and the vertical axis indicates the reflectance, the ripple is represented by the shape in which the magnitude fluctuates periodically like a sinusoidal wave, as shown in FIG. 2. FIG. 2 shows the reflectance of a structure in which a porous glass layer having a thickness of 1 micrometer is disposed on a quartz glass base member. If such a ripple is present, the wavelength dependence of the reflectance is enhanced, and suitability for the optical member may become poor.

The optical member according to an aspect of the present invention is configured to be provided with the glass layer 2, in which a transparent material is held in the inside of a porous structure of the porous glass layer, on the base member 1. Specifically, as for the configuration, in the thickness direction of the glass layer 2, the content of the transparent material in the base member 1 side with respect to the center line of the glass layer 2 is larger than the content of the transparent material in the side opposite to the base member 1 with respect to the center line of the glass layer 2. That is, as for the optical member according to an aspect of the present invention, in the thickness direction of the glass layer 2, the porosity in the base member 1 side with respect to the center line of the glass layer 2 is smaller than the porosity in the side opposite to the base member 1 with respect to the center line of the glass layer 2.

In FIG. 1, the center line of the glass layer 2 in the thickness direction is indicated by a dotted line, a region located in the base member 1 side with respect to the dotted line is represented by 2a, and a region located in the side opposite to the base member 1 with respect to the dotted line is represented by 2b.

According to the above-described configuration, the refractive index increases in the order of the region 2a and the region 2b. Therefore, the refractive index becomes close to the refractive index of the base member 1 in the order of the region 2a and the region 2b in the thickness direction, so that a sharp change in the refractive index is suppressed and reflection at the interface between the base member 1 and the glass layer 2 is suppressed. As a result, it is possible to suppress a ripple due to interference of the light reflected at the surface of the glass layer 2 with the light reflected at the interface between the base member 1 and the glass layer 2. The refractive index is calculated on the basis of the reflectance measurement or the ellipsometry measurement.

The transparent material according to an aspect of the present invention is a material having a transmittance of 50% or more in the visible light region with a wavelength of 450 nm or more and 750 nm or less. The transparent material according to an aspect of the present invention can be a material having a transmittance of 80% or more in the visible light region with a wavelength of 450 nm or more and 750 nm or less. Examples of transparent materials include monomers, dimers, and organic polymers (resin materials) comprising at least trimmers and inorganic polymers produced by a sol-gel method. Examples of resin materials include a group consisting of acrylic acid esters, methacrylic acid esters, derivatives thereof, and epoxy resins.

The transparent material is different from a material constituting the skeleton of the porous structure of the porous glass layer from the viewpoint of control of the refractive index. In particular, in the case where the refractive index of the skeleton of the porous structure of the porous glass layer is more than or equal to the refractive index of the base member, the refractive index of the transparent material can be less than or equal to the refractive index of the skeleton of the porous glass layer to reduce the reflectance. For example, in the case where both the base member and the skeleton of the porous glass layer are formed from silicon oxide, the refractive index of the transparent material is preferably 1.60 or less.

The refractive index of the transparent material can be smaller than the refractive index of the material constituting the base member. Specific examples of transparent materials include fluorides, e.g., magnesium fluoride. Meanwhile, the transparent material may be a material produced by combining a high-refractive index material, e.g., titania or zirconia, and a low-refractive index material, e.g., magnesium fluoride, insofar as the substantial refractive index of the glass layer 2 is less than or equal to the refractive index of the base member.

In the case where the refractive index of the skeleton of the porous structure of the porous glass layer is less than the refractive index of the base member, the refractive index of the transparent material may be larger than the refractive index of the skeleton of the porous glass layer insofar as the substantial refractive index of the glass layer 2 is less than or equal to the refractive index of the base member.

It is favorable that the transparent material is a material which is allowed to fill in or adhere to holes in the porous glass layer easily and the content of which is controlled easily. Specifically, a resin material having a low degree of polymerization is desirable. For example, the above-described materials may be used as the resin material.

The porosity of the glass layer 2 may be calculated by the same method as that of the porosity of the porous glass layer. The porosity of the porous glass layer is calculated as described below. The electron microscopy image is binarized into a skeleton portion and a hole portion. Specifically, a scanning electron microscope (FE-SEM S-4800, produced by Hitachi, Ltd.) is used and the porous glass layer is subjected to surface observation at an acceleration voltage of 5.0 kV at a magnification of 100,000× (50,000× in some cases), where shading of the skeleton is observed easily.

The observed image is stored as an image, and the SEM image is made into a graphical form on the basis of the frequency of image density by using image analysis software. FIG. 4 is a diagram showing the frequency on the basis of the image density of a spinodal type porous structure. In FIG. 4, the peak portion indicated by an arrow in the downward direction of the image density corresponds to the skeleton portion located at the front.

The light portion (skeleton portion) and the dark portion (hole portion) are binarized into white and black, where an inflection point near the peak position is taken as a threshold value. An average value of the ratios of the area of dark portion to the area of total portion (sum of areas of white and black portions) of the whole image is determined and is taken as the porosity. The porosity of the glass layer 2 may be calculated in the same manner by binarization into the hole portion of the glass layer 2 and the other portion.

FIG. 3A to FIG. 3D are schematic diagrams showing the states of a transparent material 20 held in the porous glass layer 2 according to aspects of the present invention. The lower portion of the drawing is the base member 1 side. FIG. 3A shows the state in which the transparent material 20 is filled in holes 10 of the glass layer 2 from the surface or the interface to the base member 1 up to a predetermined thickness (double-dotted chain line A). In this case, the transparent material 20 is not filled in the holes 10 in the vicinity of the surface of the glass layer 2. Consequently, the content of the transparent material 20 in the base member 1 side with respect to the center line of the glass layer 2 is larger than the content of the transparent material 20 in the side opposite to the base member 1 with respect to the center line of the glass layer 2. That is, in the thickness direction of the glass layer 2, the porosity in the base member 1 side with respect to the center line of the glass layer 2 is smaller than the porosity in the side opposite to the base member 1 with respect to the center line of the glass layer 2. In this regard, reference numeral 13 denotes silicon oxide serving as a skeleton portion of the porous glass layer.

FIG. 3B shows the state in which holes in the glass layer 2 include holes 10 filled with the transparent material 20 and holes 10 holding no transparent material 20. In this case as well, it is enough that, when the whole glass layer 2 is observed, the amount of adhesion of the transparent material 20 in the base member 1 side with respect to the center line of the glass layer 2 is larger than the amount of adhesion of the transparent material 20 in the side opposite to the base member 1 with respect to the center line of the glass layer 2. Then, it is said that the content of the transparent material 20 in the base member 1 side with respect to the center line of the glass layer 2 is larger than the content of the transparent material 20 in the side opposite to the base member 1 with respect to the center line of the glass layer 2.

FIG. 3C shows the state in which the transparent material 20 adheres to only part of the individual holes 10 in the glass layer 2. In this case as well, it is enough that, when the whole glass layer 2 is observed, the amount of adhesion of the transparent material 20 in the base member 1 side with respect to the center line of the glass layer 2 is larger than the amount of adhesion of the transparent material 20 in the side opposite to the base member 1 with respect to the center line of the glass layer 2, as with the case shown in FIG. 3B.

FIG. 3D shows the state in which the transparent material 20 adheres to at least the whole surface of the skeleton 13 of the porous glass layer. In this case as well, it is enough that, when the whole glass layer 2 is observed, the amount of adhesion of the transparent material 20 in the base member 1 side with respect to the center line of the glass layer 2 is larger than the amount of adhesion of the transparent material 20 in the side opposite to the base member 1 with respect to the center line of the glass layer 2, as with the case shown in FIG. 3B. In this regard, the states shown in FIG. 3A to FIG. 3D may be present in combination. For example, the glass layer 2 may have a configuration in which the transparent material is filled in part of holes, the transparent material partly adheres to part of holes, and no transparent material adheres to part of holes.

The content of the transparent material may be discontinuous between the region 2a and the region 2b shown in FIG. 1, but can be continuous because the interface causing a difference in refractive index is eliminated.

The content of the transparent material may be uniform in the region 2a. However, the content of the transparent material can decrease from the interface to the base member 1 toward the region 2b side. Likewise, in the region 2b, the content of the transparent material can decrease from the interface to the region 2a toward the surface side.

In the case where the transparent material is a resin, element analysis may be performed in the thickness direction of the glass layer 2 (resin-containing glass layer). As for the optical member according to an aspect of the present invention, it is predicted that, in the thickness direction of the glass layer 2, the content of carbon in the base member 1 side with respect to the center line of the glass layer 2 is larger than the content of carbon in the side opposite to the base member 1 with respect to the center line of the glass layer 2.

The thickness of the glass layer 2 is not specifically limited, and is preferably 0.5 micrometers or more and 10.0 micrometers or less. If the thickness is less than 0.5 micrometers, a glass layer 2 exhibiting an effect of suppressing a ripple and having high surface strength and a high porosity (low refractive index) is not obtained. If the thickness is more than 10.0 micrometers, an effect of haze increases and the handleability as an optical member is degraded.

As for the thickness of the glass layer 2 or the porous glass layer, specifically, a scanning electron microscope (FE-SEM S-4800, produced by Hitachi, Ltd.) is used and a SEM image (electron micrograph) at an acceleration voltage of 5.0 kV is taken. The thickness of the glass layer portion on the base member of the taken image is measured at 30 or more points and the average value thereof is used.

In the optical member according to an aspect of the present invention, a nonporous film having a refractive index smaller than that of the glass layer 2 may be disposed on the surface of the glass layer 2.

A base member made from any material may be used as the base member 1 in accordance with the purpose. Examples of the materials for the base member 1 can include quartz glass and rock crystal from the viewpoints of transparency, heat resistance, and strength. The base member 1 may have a configuration in which layers made from different materials are stacked.

The base member 1 can be transparent. The transmittance of the base member 1 is preferably 50% or more in the visible light region (wavelength region of 450 nm or more and 650 nm or less), and more preferably 60% or more. In the case where the transmittance is less than 50%, a problem may occur in the use as an optical member. The base member 1 may be a material for a low-pass filter and a lens.

Specific examples of the optical members according to aspects of the present invention include optical members, e.g., polarizers used in various displays of televisions, computers, and the like and liquid crystal display apparatuses, finder lenses for cameras, prisms, fly-eye lenses, and toric lenses and various lenses of image taking optical systems including them, observation optical systems, e.g., binoculars, projection optical systems used for liquid crystal projectors and the like, and scanning optical systems used for laser beam printers and the like.

The optical members according to aspects of the present invention may be mounted on image pickup apparatuses, e.g., digital cameras and digital video cameras. FIG. 5 is a schematic sectional diagram showing a camera (image pickup apparatus) that uses an optical member according to an embodiment of the present invention, specifically, an image pickup apparatus that forms a subject image from a lens onto an image pickup element through an optical filter. An image pickup apparatus 300 includes a main body 310 and a detachable lens 320. The image pickup apparatus, e.g., a digital single-lens reflex camera, obtains imaging screens at various field angles by changing an imaging lens to be used for photographing to a lens having a different focal length. The main body 310 includes an image pickup element 311, an infrared-cut filter 312, a low-pass filter 313, and the optical member 314 according to an aspect of the present invention. The optical member 314 includes the base member 1 and the glass layer 2, as shown in FIG. 1.

The optical member 314 and the low-pass filter 313 may be formed integrally or be formed independently. The optical member 314 may be configured to also serve as a low-pass filter. That is, the base member 1 of the optical member 314 may be the low-pass filter.

The image pickup element 311 is held in a package (not shown in the drawing) and this package keeps the image pickup element 311 in a hermetically sealed state with a cover glass (not shown in the drawing). A sealing member, e.g., a double-sided tape, seals between the optical filters, e.g., the low-pass filter 313 and the infrared-cut filter 312, and the cover glass (not shown in the drawing). An example in which both the low-pass filter 313 and the infrared-cut filter 312 are provided as optical filters will be described, although any one of them may be provided alone.

The vicinity of the surface of the optical member 314 according to an aspect of the present invention has a porous structure and, therefore, is excellent in terms of dustproof performance, e.g., suppression of dust adhesion. Consequently, the optical member 314 is disposed in such a way as to be located on the side opposite to the image pickup element 311 of the optical filter. The optical member is disposed in such a way that the glass layer 2 is located farther from the image pickup element 311 than the base material 1 is. Put another way, the optical member 314 can be disposed in such a way that the base member 1 and the glass layer 2 are disposed in that order from the image pickup element 311 side. The optical member 314 and the image pickup element 311 are mutually disposed in such a way that image pickup element 311 can take the image passed through the optical member 314.

The image pickup apparatus 300 according to an aspect of the present invention may include a foreign matter removing apparatus (not shown in the drawing) to remove foreign matters by applying vibration or the like. The foreign matter removing apparatus is configured to include a vibration member, a piezoelectric element, and the like.

The foreign matter removing apparatus may be disposed at any position between the image pickup element 311 and the optical member 314. For example, the foreign matter removing apparatus may be disposed in such a way that the vibration member comes into contact with the optical member 314, in such a way that the vibration member comes into contact with the low-pass filter 313, or in such a way that the vibration member comes into contact with the infrared-cut filter 312. In particular, in the case where the vibration member is disposed in such a way as to come into contact with the optical member 314, foreign matters, e.g., dirt, dust, and stain, do not adhere easily to the optical member 314 according to an aspect of the present invention, so that foreign matters can be removed more efficiently.

The vibration member of the foreign matter removing apparatus may be formed integrally with the optical member 314 or an optical filter, e.g., the low-pass filter 313 or the infrared-cut filter 312. The vibration member may be formed from the optical member 314, or have a function of the low-pass filter 313, the infrared-cut filter 312, or the like.

Method for Manufacturing Optical Member

The optical member according to an aspect of the present invention is configured to include a porous glass layer on a base member and is formed as described below. That is, a glass powder layer containing a plurality of glass powders is formed on the base member, and the plurality of glass powders are fused to form a glass body layer. The glass body layer is heated to form a phase-separated glass, and a porous glass layer having three-dimensionally penetrated holes is formed by etching. Subsequently, part of holes of the porous glass layer are allowed to hold a transparent material (resin material), so that a transparent material-containing glass layer (resin-containing glass layer) is formed.

Next, each step of the method for manufacturing the optical member according to an aspect of the present invention will be described in detail with reference to FIG. 6A to FIG. 6E.

Step of Forming Glass Powder Layer

As shown in FIG. 6A, a glass powder layer 4 containing a glass powder 3 is formed on the base member 1.

In the present invention, it is necessary to form a porous glass layer 7 having a porous structure derived from spinodal type phase separation on the base member 1. For this purpose, precise control of the glass composition is required and a method in which the glass composition is settled once, the phase-separable glass powder 3 is produced, the resulting glass powder 3 is applied to the base member 1, and a film is formed by fusing can be employed.

A phase separation property refers to a property that phase separation is induced by a heat treatment. Examples of phase-separable glasses include silicon oxide based glass I (silicon oxide-boron oxide-alkali metal oxide), silicon oxide based glass II (silicon oxide-boron oxide-alkali metal oxide-(alkaline-earth metal oxide, zinc oxide, aluminum oxide, zirconium oxide)), and titanium oxide based glass (silicon oxide-boron oxide-calcium oxide-magnesium oxide-aluminum oxide-titanium oxide). Among them, borosilicate based glass composed of silicon oxide-boron oxide-alkali metal oxide can be employed. In particular, the borosilicate based glass having a composition in which the proportion of silicon oxide is 55.0 percent by weight or more and 95.0 percent by weight or less, and especially 60.0 percent by weight or more and 85.0 percent by weight or less can be employed. In the case where the proportion of silicon oxide is in the above-described range, phase-separated glass having high skeletal strength tends to be obtained easily and, therefore, is useful in applications where the strength is required. The molar ratio of boron to the alkali component is preferably 0.25 or more and 0.4 or less. If the ratio is out of this range, breakage of the film may occur because of expansion and shrinkage during etching.

As for a method for manufacturing the base glass serving as the phase-separable glass powder 3, the base glass may be produced by a known method except that a raw material is prepared to have the composition of the above-described phase-separable glass. For example, production may be performed by heating and melting the raw material containing supply sources of the individual components and, as necessary, by molding the raw material into a predetermined form. In the case where heating and melting are performed, the heating temperature may be set appropriately in accordance with the raw material composition and the like, and usually the heating and melting may be performed within the range of 1,350 degrees (celsius) to 1,500 degrees (celsius).

Thereafter, the base glass is pulverized into a glass powder 3. The pulverizing method is not specifically limited and a known pulverizing method may be used. Examples of pulverizing methods include liquid phase pulverizing methods using a bead mill and vapor phase pulverizing methods using a jet mill.

The printing method, the spin coating method, the dip coating method, or the like is mentioned as an example of a method for forming the glass powder layer 4. Explanations will be made below with reference to a method by using a common screen printing method as an example. In the screen printing method, the glass powder 3 is made into a paste and is printed by using a screen printing machine. Therefore, adjustment of the paste is necessary. The paste contains a thermoplastic resin, a plasticizer, a solvent, and the like in addition to the above-described glass powder 3.

It is desirable that the proportion of the glass powder 3 contained in the paste be within the range of 30.0 percent by weight or more and 90.0 percent by weight or less, and preferably 35.0 percent by weight or more and 70.0 percent by weight or less.

The thermoplastic resin contained in the paste is a component that enhances the film strength after drying and imparts flexibility. As for the thermoplastic resin, polybutyl methacrylate, polyvinyl butyral, polymethyl methacrylate, polyethyl methacrylate, ethyl cellulose, and the like may be used. These thermoplastic resins may be used alone or in combination. The content of the thermoplastic resin contained in the paste is preferably 0.1 percent by weight or more and 30.0 percent by weight or less. If the content is less than 0.1 percent by weight, the film strength after drying tends to become low. If the content is more than 30.0 percent by weight, unfavorably, residual components of the resin remain easily in the film after fusion.

Examples of plasticizers contained in the paste include butylbenzyl phthalate, dioctyl phthalate, diisooctyl phthalate, dicapryl phthalate, and dibutyl phthalate. These plasticizers may be used alone or in combination. The content of the plasticizer contained in the paste is preferably 10.0 percent by weight or less. Addition of the plasticizer may control the drying rate and impart flexibility to a dried film.

Examples of solvent contained in the paste include terpineol, diethylene glycol monobutyl ether acetate, and 2,2,4-trimethyl-1,3-pentanediol monoisobutyrate. The above-described solvents may be used alone or in combination. The content of the solvent contained in the paste is preferably 10.0 percent by weight or more and 90.0 percent by weight or less. If the content is less than 10.0 percent by weight, a uniform film is not obtained easily. If the content is more than 90.0 percent by weight, a uniform film is not obtained easily.

The paste may be produced by kneading the above-described materials at a predetermined ratio.

A glass powder layer 4 containing the glass powder 3 may be formed by applying the thus produced paste to the base member 1 by using a screen printing method and drying and removing the solvent component of the paste. In this regard, in order to achieve a predetermined thickness, the paste may be repeatedly applied an appropriate number of times and be dried.

A base member made from any material may be used as the base member 1 in accordance with the purpose. Examples of the materials for the base member 1 include quartz and rock crystal. The base member 1 may be a material for a low-pass filter and a lens. Meanwhile, the base member 1 can contain silicon oxide and be non-phase separable. As for the shape of the base member 1, a base member having any shape may be used insofar as the porous glass layer 7 can be formed. The shape of the base member 1 may have a curvature.

Step of Fusing Glass Powder

As shown in FIG. 6B, a phase-separable glass body layer 5 is formed on the base member 1 by fusing particles of the glass powder 3 of the glass powder layer 4 through heating.

As the temperature in fusion becomes higher, the viscosity of the glass is reduced, so that a flat film is formed easily and scattering at the surface of the film is reduced. However, if the temperature during fusion is higher than or equal to the crystallization temperature of the glass powder 3, the phase-separable glass body layer 5 is crystallized, scattering occurs because of this crystal, so as to cause reduction in transmittance. In the present invention, this fusion step is performed by heating at a temperature higher than or equal to the glass transition temperature and lower than or equal to the crystallization temperature and, thereby, particles of the glass powder 3 are fused without being crystallized and the glass body layer 5 is formed. Specifically, heating is performed at a temperature of preferably 500 degrees (celsius) or higher and 800 degrees (celsius) or lower. As for the heating time, the temperature is maintained for preferably 10 hours or more and 100 hours or less.

Meanwhile, in order to eliminate the resulting crystallization, a method may be adopted, wherein particles of the glass powder 3 are fused at a temperature sufficiently higher than the crystallization temperature, for example, at a high temperature of 1,000 degrees (celsius) or higher and 1,300 degrees (celsius) or lower. In this case, even when crystallization occurs during raising of temperature, the fusion temperature is high and, thereby, the crystal in itself is melted, so that crystals do not remain in the glass body layer 5 easily. As for the heating time, the temperature is maintained for preferably 1 minute or more and 30 minutes or less.

From the viewpoint of obtainment of an optical member having a high transmittance, the oxygen concentration during fusion is specified to be preferably more than 20%, and the oxygen concentration is further preferably 50% or more.

Examples of heating methods during fusion include an electric furnace, an oven, resistance heating, and infrared lamp heating. In particular, the infrared lamp heating can be employed, and heating can be performed from the base member 1 by disposing a setter of SiC, Si, or the like under the base member 1.

Step of Forming Phase-Separated Glass Layer

As shown in FIG. 6C, the phase-separable glass body layer 5 formed on the base member 1 is heated, so as to form a phase-separated glass layer 6. Here, the phase-separated glass layer 6 refers to a glass layer phase-separated into a silicon oxide rich phase and a non-silicon oxide rich phase.

The heat treatment of phase separation is performed by maintaining a temperature of 500 degrees (celsius) or higher and 700 degrees (celsius) or lower for 1 hour or more and 100 hours or less. The temperature and the time may be set appropriately in accordance with the hole diameter and the like of the resulting porous glass layer. The heat treatment temperature is not necessarily a constant temperature. The temperature may be changed continuously or stepwise.

As for the heating method, the methods mentioned in the step of fusing the glass powder may be adopted.

Step of Forming Porous Glass Layer

As shown in FIG. 6D, the phase-separated glass layer 6 formed on the base member 1 is subjected to an etching treatment and, thereby, a porous glass layer 7 having continuous holes is formed on the base member 1. The non-silicon oxide rich phase is removed by the etching treatment while the silicon oxide rich phase of the phase-separated glass layer 6 remains. The remaining portion serves as a skeleton of the porous glass layer 7 and the portion from which the non-silicon oxide rich phase has been removed serves as a hole of the porous glass layer 7.

In general, the etching treatment to remove the non-silicon oxide rich phase is a treatment to elute the non-silicon oxide rich phase, which is a soluble phase, through contact with an aqueous solution. In general, the method for bringing the aqueous solution into contact with the glass is a method in which the glass is immersed in the aqueous solution, although not specifically limited insofar as the glass is brought into contact with the aqueous solution in the method. For example, the glass may be coated with the aqueous solution. As for the aqueous solution required for the etching treatment, known solutions, e.g., water, acid solutions, and alkaline solutions, capable of dissolving the non-silicon oxide rich phase may be used. A plurality of types of step to bring the glass into contact with these aqueous solutions may be selected in accordance with uses.

In the etching treatment of common phase-separated glass, an acid treatment is used favorably from the viewpoints of a small load on an insoluble phase (silicon oxide rich phase) and the degree of selective etching. The non-silicon oxide rich phase, which is an acid-soluble component, is removed through elution because of contact with an acid solution, while corrosion of the silicon oxide rich phase is relatively small, so that high selective etchability is ensured.

Examples of acid solutions can include inorganic acids, e.g., hydrochloric acid and nitric acid. As for the acid solution, usually, an aqueous solution by using water as a solvent can be employed. Usually, the concentration of the acid solution may be specified to be within the range of 0.1 mol/L or more and 2.0 mol/L or less appropriately. In the acid treatment step, the temperature of the acid solution may be specified to be within the range of room temperature to 100 degrees (celsius) and the treatment time may be specified to be 1 hour or more and 500 hours or less.

Several hundred nanometers of silicon oxide layer, which hinders etching, may be generated on the glass surface after the phase separation heat treatment depending on the glass composition. This surface layer may be removed by polishing, an alkali treatment, or the like.

Gel silicon oxide may deposit on the skeleton depending on the glass composition. If necessary, a multistage etching method using acid etching solutions having different acidities or water may be employed. Etching may be performed at etching temperatures of 15 degrees (celsius) or higher and 95 degrees (celsius) or lower. Ultrasonic waves may be applied during the etching treatment, if necessary.

In general, a water treatment can be performed after a treatment with an acid solution, an alkaline solution, or the like is performed. In the case where the water treatment is performed, adhesion of residual components to a porous glass skeleton is suppressed and a porous glass layer 7 having a higher porosity tends to be obtained.

In general, the temperature in the water treatment step is preferably within the range of 15 degrees (celsius) or higher and 100 degrees (celsius) or lower. The duration of the water treatment step is specified appropriately in accordance with the composition, the size, and the like of the glass concerned and may be usually about 1 hour or more and 50 hours or less.

The average hole diameter of the porous glass layer 7 is preferably 10 nm or more and 100 nm or less, and more preferably 20 nm or more and 50 nm or less. If the average hole diameter is less than 10 nm, the transparent material does not enter holes of the porous structure easily. If the average hole diameter is more than 100 nm, scattering of the visible light increases unfavorably. Furthermore, the average hole diameter is preferably 50 nm or less because scattering is suppressed. The average hole diameter can be smaller than the thickness of the porous glass layer 7.

The average hole diameter in the present invention is defined as an average value of the minor axes of a plurality of approximated ellipses, where holes in a region of 5 micrometers by 5 micrometers in an arbitrary cross-section of the porous body are approximated by the plurality of ellipses. Specifically, for example, as shown in FIG. 7A, an electron micrograph of the porous body surface is used, holes 10 are approximated by a plurality of ellipses 11, an average value of the minor axes 12 of the individual ellipses is determined and, thereby, the average hole diameter is obtained. At least 30 points are measured and an average value thereof is determined. Also, the average hole diameter of the glass layer 2 may be calculated in the same manner.

The average skeleton diameter of the porous glass layer 7 is preferably 10 nm or more and 100 nm or less, and more preferably 20 nm or more and 50 nm or less. If the average skeleton diameter is more than 100 nm, the light is scattered considerably, and the transmittance is reduced significantly. If the average skeleton diameter is less than 10 nm, the strength of the porous glass layer 7 tends to become small.

The average skeleton diameter in the present invention is defined as an average value of the minor axes of a plurality of approximated ellipses, where the skeleton of the porous body in a region of 5 micrometers by 5 micrometers in an arbitrary cross-section is approximated by the plurality of ellipses. Specifically, for example, as shown in FIG. 7B, an electron micrograph of the porous body surface is used, the skeleton 13 is approximated by a plurality of ellipses 14, an average value of the minor axes 15 of the individual ellipses is determined and, thereby, the average skeleton diameter is obtained. At least 30 points are measured and an average value thereof is determined.

Step of Forming Glass Layer

As shown in FIG. 6D, a glass layer 2 is formed on the base member 1 by allowing part of holes in the porous glass layer 7 formed on the base member 1 to hold a transparent material. Specifically, the holes in the porous glass layer 7 are allowed to hold the transparent material in such a way that, in the thickness direction of the glass layer 2, the porosity in the base member 1 side with respect to the center line of the glass layer 2 becomes smaller than the porosity in the side opposite to the base member 1 with respect to the center line of the glass layer 2.

The transparent material according to an aspect of the present invention is a material having a transmittance of 50% or more in the visible light region with a wavelength of 450 nm or more and 750 nm or less. Examples of transparent materials include monomers, dimers, and organic polymers (resin materials) comprising at least trimmers and inorganic polymers produced by a sol-gel method. Examples of resin materials include a group consisting of acrylic acid esters, methacrylic acid esters, derivatives thereof, and epoxy resins.

The transparent material is different from a material constituting the skeleton of the porous structure of the porous glass layer from the viewpoint of control of the refractive index. In particular, in the case where the refractive index of the skeleton of the porous structure of the porous glass layer is more than or equal to the refractive index of the base member, the refractive index of the transparent material can be less than or equal to the refractive index of the skeleton of the porous glass layer to reduce the reflectance. For example, in the case where both the base member and the skeleton of the porous glass layer are formed from silicon oxide, the refractive index of the transparent material is preferably 1.60 or less.

The refractive index of the transparent material can be smaller than the refractive index of the material constituting the base member. Specific examples of transparent materials include fluorides, e.g., magnesium fluoride. Meanwhile, the transparent material may be a material produced by combining a high-refractive index material, e.g., titania or zirconia, and a low-refractive index material, e.g., magnesium fluoride, insofar as the substantial refractive index of the glass layer is less than or equal to the refractive index of the base member.

In the case where the refractive index of the skeleton of the porous structure of the porous glass layer is less than the refractive index of the base member, the refractive index of the transparent material may be larger than the refractive index of the skeleton of the porous glass layer insofar as the substantial refractive index of the glass layer is less than or equal to the refractive index of the base member.

It is favorable that the transparent material is a material which is allowed to fill in or adhere to holes in the porous glass layer easily and the content of which is controlled easily. Specifically, a resin material having a low degree of polymerization is desirable. For example, the above-described materials may be used as the resin material.

As a method for allowing part of holes in the porous glass layer 7 to hold the transparent material, a method in which the transparent material is filled into the whole holes in the porous glass layer 7 and, thereafter, the transparent material in the vicinity of the surface thereof is removed, so as to expose the skeleton of the porous glass layer 7 is mentioned. Another method is mentioned, in which the transparent material is filled into holes in the porous glass layer 7 in such a way that the transparent material is not filled into the vicinity of the surface of the porous glass layer 7 and the skeleton of the porous glass layer 7 is exposed, as described later.

As for the method for infiltrating the transparent material into holes in the porous glass layer 7, known methods, e.g., a dipping method, a spin coating method, a spraying method, an evaporation method, and combinations thereof may be adopted appropriately. In addition, in order that the transparent material is penetrated into holes in the porous glass layer 7 easily, a method in which the transparent material is dissolved into a solvent to adjust the viscosity, surface tension, or the like, and the resulting solution is applied to the porous glass layer 7 is mentioned. As for another method, the transparent material may be penetrated into holes in the porous glass layer 7 in a sealed container while deaeration is performed.

In the case where a resin material is used as the transparent material, in order to enhance the adhesion to the skeleton of the porous glass layer 7, a silane coupling agent may be used in combination. A combination of a plurality of materials having different refractive indices may be used as the resin material to adjust the refractive index. After the transparent material is penetrated into holes, in order to fix the resin material to the holes, the resin material can be cured, if possible. As for the curing method, a thermosetting resin material may be cured by heat, or a photo-curable resin may be cured by light irradiation. A resin material including a photo-polymerization initiator may be used and be cured by light irradiation in this case.

In the case where the resin material is used as the transparent material, it is desirable that the resin material be applied to the porous glass layer 7. Holes in the vicinity of the interface between the base member 1 and the porous glass layer 7 are mainly filled with the resin material, taking advantage of the liquid properties (solid content, vapor pressure (evaporation rate), and the like) of the coating solution containing the resin material.

In consideration of filling of the resin material into the porous structure, it is believed that contribution of the interfacial energy is large as compared with a flat film. Therefore, it is necessary that a vapor pressure factor is taken into consideration in addition to the factors of the solid concentration and the viscosity of the liquid which are taken into consideration in application to a flat film. The vapor pressure and the evaporation rate are in a proportional relationship. The evaporation rate of the coating solution in which the resin material has been dissolved depends on the evaporation rate of a solvent to dissolve the resin material to a great extent.

In the case where holes in the vicinity of the interface between the base member 1 and the porous glass layer 7 are mainly filled with the resin material, a solution having an evaporation rate relative to butyl acetate of 0.001 or more and 2.000 or less and a solid (resin material) concentration of the coating solution of 0.100 percent by weight or more and 0.130 percent by weight or less can be used.

In the case where the solution under this condition is used, immediate evaporation of the solvent during application of the solution is suppressed, so that blocking of holes by the solid content (resin) at the surface of the porous glass layer 7 is suppressed. Consequently, it is believed to be possible to penetrate the resin material into the inner parts of the holes in the porous glass layer 7. As a result, it is possible to simply produce an optical member in which, in the thickness direction of the glass layer, the content of the resin material in the base member 1 side with respect to the center line of the glass layer 2 is larger than the content of the resin material in the side opposite to the base member 1 with respect to the center line of the glass layer 2. That is, in the thickness direction of the glass layer, the porosity in the base member side with respect to the center line of the glass layer is smaller than the porosity in the side opposite to the base member with respect to the center line of the glass layer.

In addition, a solution having an evaporation rate relative to butyl acetate of 0.300 or more and 1.000 or less and a solid (resin material) concentration of the coating solution of 0.100 percent by weight or more and 0.110 percent by weight or less can be used.

Examples of solvents include various alcohols, aliphatic or alicyclic hydrocarbons, aromatic hydrocarbons, esters, ketones, ethers, and aprotic solvents, and the evaporation rate is important. Examples of solvents having a relatively low evaporation rate include 2-butanol, toluene, methanol, and ethylcellosolve. On the other hand, examples of solvents having a relatively high evaporation rate include ethyl acetate and tetrahydrofuran.

As described above, it becomes possible to fill the resin into holes in the vicinity of the interface between the base member 1 and the porous glass layer 7 by controlling the properties, in particular solid concentration and the evaporation rate of the solvent, of the solution (coating solution) in which the resin material has been dissolved and, thereby, an optical member exhibiting excellent ripple suppression is obtained.

EXAMPLES

The present invention will be described below with reference to the examples. However, the present invention is not limited to the examples.

(1) Production Example of Glass Powder

A mixed powder of silicon oxide, boron oxide, sodium carbonate, and alumina was fused in a platinum crucible at 1,500 degrees (celsius) for 24 hours, where the charge composition was specified to be 64 percent by weight of $SiO_2$, 27 percent by weight of $B_2O_3$, 6 percent by weight of $Na_2O$, and 3 percent by weight of $Al_2O_3$. The fused material was poured into a graphite mold after the temperature was lowered to 1,300 degrees (celsius). Standing to cool was performed in air for about 20 minutes, keeping was performed in a slow cooling furnace at 500 degrees (celsius) for 5 hours, and thereafter, cooling to room temperature was performed over 24 hours, so as to obtain borosilicate glass. The resulting block of the borosilicate glass was pulverized with a bead mill until the average particle diameter became 4.5 micrometers, so as to obtain a glass powder.

(2) Production Example of Glass Paste

A glass paste was obtained by agitating and mixing 60 parts by mass of glass powder obtained in the above-described item (1), 44 parts by mass of alpha-terpineol, and 2 parts by mass of ethyl cellulose (registered trademark ETHOCEL Std 200 (produced by Dow Chemical Company)). The viscosity of the glass paste was 31,300 mPa*s.

(3) Production Example of Porous Glass Layer on Base Member

The glass paste obtained in the above-described item (2) was applied to a quartz substrate (produced by IIYAMA PRECISION GLASS CO., LTD., softening point 1,700 degrees (celsius), Young's modulus 72 GPa) by screen printing. A printing machine employed was MT-320TV produced by Micro-tec Co., Ltd. A printing plate 25 mm by 25 mm of #500 and a solid image were used.

The solvent was dried by standing in a drying furnace at 100 degrees (celsius) for 10 minutes, so as to obtain a glass powder layer. The temperature of the resulting glass powder layer was raised to 700 degrees (celsius) at a temperature raising rate of 20 degrees (celsius)/min and was maintained for 1 hour. Thereafter, the temperature was lowered to 600 degrees (celsius) at a temperature lowering rate of 10 degrees (celsius)/min and was maintained for 50 hours. Subsequently, the surface was polished, so as to obtain a glass body in which a phase-separated glass was formed on the quartz substrate.

The glass body was immersed in a 1 mol/L nitric acid aqueous solution heated to 80 degrees (celsius) and was stood for 24 hours while being kept at 80 degrees (celsius). Then, the glass body was immersed in distilled water heated to 80 degrees (celsius) and was stood for 24 hours at 80 degrees (celsius). The glass body was taken out of the solution and was dried at room temperature for 12 hours. According to SEM observation of a cross-section, it was ascertained that a porous glass layer having a thickness of about 1 micrometer was disposed on the quartz substrate.

Reflectance 1

The reflectance of the structure was measured. The reflectance is shown in FIG. 2. A lens reflectance measuring apparatus (USPM-RU, produced by Olympus Corporation) was used in the measurement of the reflectance. Light was incident from the side opposite to the base member, and the amount of the reflected light thereof was measured. The measurement wavelength region was 400 nm to 750 nm.

(4) Preparation of Solution Containing Transparent Material (4-1) Preparation Example of Solution 1

Solution 1 was obtained by mixing pentaerythritol triacrylate (PETA) serving as a photo-polymerizable monomer as a transparent material to be filled into holes in the porous glass layer, ethylcellosolve serving as a solvent to dilute the transparent material, and 1-hydroxycyclohexylphenyl ketone (IRGACURE184) serving as a photo-polymerization initiator. The concentration of PETA in the solution was 0.100 percent by weight.

(4-2) Preparation Example of Solution 2

Solution 2 was obtained in the same manner as with Solution 1 except that 2-butanol was employed as the solvent.

(4-3) Preparation Example of Solution 3

Solution 3 was obtained in the same manner as with Solution 2 except that the PETA concentration in the solution was specified to be 0.125 percent by weight.

(4-4) Preparation Example of Solution 4

Solution 4 was obtained in the same manner as with Solution 2 except that the PETA concentration in the solution was specified to be 0.167 percent by weight.

(4-5) Preparation Example of Solution 5

Solution 5 was obtained in the same manner as with Solution 2 except that the PETA concentration in the solution was specified to be 0.200 percent by weight.

(4-6) Preparation Example of Solution 6

Solution 6 was obtained in the same manner as with Solution 2 except that the PETA concentration in the solution was specified to be 0.250 percent by weight.

(4-7) Preparation Example of Solution 7

Solution 7 was obtained in the same manner as with Solution 2 except that the PETA concentration in the solution was specified to be 0.333 percent by weight.

(4-8) Preparation Example of Solution 8

Solution 8 was obtained in the same manner as with Solution 1 except that toluene was used as the solvent.

(4-9) Preparation Example of Solution 9

Solution 9 was obtained in the same manner as with Solution 1 except that methanol was used as the solvent.

(4-10) Preparation Example of Solution 10

Solution 10 was obtained in the same manner as with Solution 1 except that diethylene glycol was used as the solvent.

(4-11) Preparation Example of Solution 11

Solution 11 was obtained in the same manner as with Solution 1 except that ethyl acetate was used as the solvent.

(4-12) Preparation Example of Solution 12

Solution 12 was obtained in the same manner as with Solution 1 except that tetrahydrofuran was used as the solvent.

(4-13) Preparation Example of Solution 13

Solution 13 was obtained by mixing a mixed monomer having the composition described below and serving as the transparent material and ethanol serving as the solvent. The concentration of the mixed monomer in the solution was 0.600 percent by weight.

Composition ratio of mixed monomer
Trifluoroethyl methacrylate 42 percent by weight
Butyl methacrylate 25 percent by weight
Stearyl methacrylate 22 percent by weight
Trimethylolpropane trimethacrylate 8 percent by weight
3-Methacryloxypropyltrimethoxysilane (silane coupling agent) 1 percent by weight
1-Hydroxycyclohexylphenyl ketone 2 percent by weight
Evaluation of Liquid Property of Solution The viscosities of Solutions 1 to 13 and the evaporation rates and the boiling points of the solvents employed are shown in Table 1. In the present invention, the evaporation rates and the boiling points of the solvents are assumed to be the evaporation rates and the boiling points of Solutions 1 to 13. The viscosity of the solution was measured by using a rotational viscometer (Model RE85L, produced by Told Sangyo Co., Ltd.). The evaporation rate of the solvent was a relative value converted on the assumption that the value of butyl acetate was specified to be 1 as a reference value.

TABLE 1

| Solvent employed | Resin material concentration (percent by weight) | Relative evaporation rate | Boiling point (degrees celsius) | Viscosity (mPa * s) |
|---|---|---|---|---|
| Solution 1 | 0.100 | 0.380 | 136 | 2.30 |
| Solution 2 | 0.100 | 0.890 | 100 | 3.21 |
| Solution 3 | 0.125 | 0.890 | 100 | 3.28 |
| Solution 4 | 0.167 | 0.890 | 100 | 3.40 |
| Solution 5 | 0.200 | 0.890 | 100 | 3.51 |
| Solution 6 | 0.250 | 0.890 | 100 | 3.77 |
| Solution 7 | 0.333 | 0.890 | 100 | 4.52 |
| Solution 8 | 0.100 | 2.00 | 111 | 0.77 |
| Solution 9 | 0.100 | 1.90 | 65 | 0.72 |
| Solution 10 | 0.100 | 0.001 | 244 | 31.1 |
| Solution 11 | 0.100 | 4.20 | 77 | 0.65 |
| Solution 12 | 0.100 | 4.85 | 66 | 0.67 |
| Solution 13 | 0.600 | 1.54 | 78 | 1.29 |

Solutions 1, 2, 3, 8, 9, and 10 satisfied that the evaporation rate relative to butyl acetate was 0.001 or more and 2.000 or less and the resin material concentration was 0.100 percent by weight or more and 0.130 percent by weight or less.

Example 1

The porous glass layer of the structure produced in the above-described item (3) was spin-coated with Solution 1 and, thereby, Solution 1 was penetrated into holes in the porous glass layer. The number of revolutions of spin coating was specified to be 5,000 rpm. Thereafter, drying was performed at 100 degrees (celsius) for 10 minutes, and UV irradiation was performed at an illuminance of 23 mW/cm$^2$ for 20 minutes, so as to obtain Optical member 1.

FIG. 8 shows a SEM image of a cross-section of Optical member 1 taken by using a scanning electron microscope (FESEM S-4800, produced by Hitachi, Ltd.). It was made clear that the transparent material was present in the vicinity of the interface between the porous glass layer and the base member (quartz substrate) and the transparent material did not remain on the surface of the porous glass layer. That is, it is believed that, in Optical member 1, the content of the transparent material in the base member side with respect to the center line of the porous glass layer in the thickness direction is larger than the content of the transparent material in the side opposite to the base member with respect to the center line of the glass layer in the thickness direction. Actually, in the thickness direction of the glass layer, the porosity in the base member side with respect to the center line of the glass layer was smaller than the porosity in the side opposite to the base member with respect to the center line of the porous glass layer.

Example 2

Optical member 2 was obtained in the same manner as with Example 1 except that Solution 2 was used in place of Solution 1.

A SEM image of a cross-section was taken as with Example 1. As a result, it was made clear that the transparent material was present in the vicinity of the interface between the porous glass layer and the base member (quartz substrate) and the transparent material did not remain on the surface of the porous glass layer. Consequently, it is believed that, in Optical member 2, the content of the transparent material in the base member side with respect to the center line of the porous glass layer in the thickness direction is larger than the content of the transparent material in the side opposite to the base member with respect to the center line of the porous glass layer in the thickness direction.

Example 3

Optical member 3 was obtained in the same manner as with Example 1 except that Solution 3 was used in place of Solution 1.

A SEM image of a cross-section was taken as with Example 1. As a result, it was made clear that the transparent material was present in the vicinity of the interface between the porous glass layer and the base member (quartz substrate) and the transparent material did not remain on the surface of the porous glass layer. It is believed that, in Optical member 3, the content of the transparent material in the base member side with respect to the center line of the porous glass layer in the thickness direction is larger than the content of the transparent material in the side opposite to the base member with respect to the center line of the porous glass layer in the thickness direction.

Example 4

Optical member 4 was obtained in the same manner as with Example 1 except that Solution 8 was used in place of Solution 1.

A SEM image of a cross-section was taken as with Example 1. As a result, it was made clear that the transparent material was present in the vicinity of the interface between the porous glass layer and the base member (quartz substrate) and the transparent material did not remain on the surface of the porous glass layer. It is believed that, in Optical member 4, the content of the transparent material in the base member side with respect to the center line of the porous glass layer in the thickness direction is larger than the content of the transparent material in the side opposite to the base member with respect to the center line of the porous glass layer in the thickness direction.

Example 5

Optical member 5 was obtained in the same manner as with Example 1 except that Solution 9 was used in place of Solution 1.

A SEM image of a cross-section was taken as with Example 1. As a result, it was made clear that the transparent material was present in the vicinity of the interface between the porous glass layer and the base member (quartz substrate) and the transparent material did not remain on the surface of the porous glass layer. It is believed that, in Optical member 5, the content of the transparent material in the base member side with respect to the center line of the porous glass layer in the thickness direction is larger than the content of the transparent material in the side opposite to the base member with respect to the center line of the porous glass layer in the thickness direction.

Example 6

Optical member 6 was obtained in the same manner as with Example 1 except that Solution 10 was used in place of Solution 1.

A SEM image of a cross-section was taken as with Example 1. As a result, it was made clear that the transparent material was present in the vicinity of the interface between the porous glass layer and the base member (quartz substrate) and the transparent material did not remain on the surface of the porous glass layer. it is believed that, in Optical member 6, the content of the transparent material in the base member side with respect to the center line of the porous glass layer in the thickness direction is larger than the content of the transparent material in the side opposite to the base member with respect to the center line of the porous glass layer in the thickness direction.

Comparative Example 1

Optical member 7 was obtained in the same manner as with Example 1 except that Solution 4 was used in place of Solution 1.

A SEM image of a cross-section was taken as with Example 1. As a result, in Optical member 7, the transparent material was filled into holes of the porous glass layer up to the surface completely.

Comparative Example 2

Optical member 8 was obtained in the same manner as with Example 1 except that Solution 5 was used in place of Solution 1.

A SEM image of a cross-section was taken as with Example 1. As a result, in Optical member 8, the transparent material was filled into holes of the porous glass layer up to the surface completely.

Comparative Example 3

Optical member 9 was obtained in the same manner as with Example 1 except that Solution 6 was used in place of Solution 1.

A SEM image of a cross-section was taken as with Example 1. FIG. 9 shows a SEM image of a cross-section of Optical member 9. In Optical member 9, the transparent material was filled into holes of the porous glass layer up to the surface completely.

Comparative Example 4

Optical member 10 was obtained in the same manner as with Example 1 except that Solution 7 was used in place of Solution 1.

A SEM image of a cross-section was taken as with Example 1. As a result, in Optical member 10, the transparent material was filled into holes of the porous glass layer up to the surface completely.

Comparative Example 5

Optical member 11 was obtained in the same manner as with Example 1 except that Solution 11 was used in place of Solution 1.

A SEM image of a cross-section was taken as with Example 1. As a result, in Optical member 11, the transparent material was filled into holes of the porous glass layer up to the surface completely.

Comparative Example 6

Optical member 12 was obtained in the same manner as with Example 1 except that Solution 12 was used in place of Solution 1.

A SEM image of a cross-section was taken as with Example 1. As a result, in Optical member 12, the transparent material was filled into holes of the porous glass layer up to the surface completely.

Comparative Example 7

Optical member 13 was obtained in the same manner as with Example 1 except that Solution 13 was used in place of Solution 1.

A SEM image of a cross-section was taken as with Example 1. As a result, in Optical member 13, the transparent material was filled into holes of the porous glass layer up to the surface completely.

Reflectance 2

The reflectance of each of optical members of Examples 1 to 6 and Comparative examples 1 to 7 was measured. A lens reflectance measuring apparatus (USPM-RU, produced by Olympus Corporation) was used in the measurement. Light was incident from the side opposite to the base member, and the amount of the reflected light thereof was measured. The measurement wavelength region was 400 nm to 750 nm.

FIG. 10 shows the wavelength dependence of reflectance of each of optical members of Examples 1 to 6. Meanwhile, FIG. 11 shows the wavelength dependence of reflectance of each of optical members of Comparative examples 1 to 7.

It is clear that the wavelength dependence of reflectance of each of optical members of Examples 1 to 6 is suppressed as compared with the reflectance of the structure produced in the above-described item (3) shown in FIG. 2.

In addition, it is clear that a maximum reflectance of each of optical members of Examples 1 to 6 is smaller than that of each of optical members of Comparative examples 1 to 7. It is believed that the wavelength dependence of reflectance of each of optical members of Comparative examples 1 to 7 is suppressed, but the resin is filled into holes of the porous glass layer up to the surface and, thereby, the reflectance at the surface thereof increases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117484, filed May 23, 2012, which is hereby incorporated by reference herein in its entirety.

REFERENCE SIGNS LIST

1 Base member
2 Glass layer
3 Glass powder
4 Glass powder layer
5 Glass body layer
6 Phase-separated glass layer
7 Porous glass layer
314 Optical member

The invention claimed is:

1. An optical member comprising:
a base member; and
a porous layer disposed on the base member, comprising a porous glass and a transparent resin material held in the inside of a porous structure of the porous glass,
wherein, in the thickness direction of the porous layer, the degree of porosity in the base member side with respect to the center line of the porous layer in the thickness direction is smaller than the degree of porosity in the side opposite to the base member with respect to the center line of the porous layer in the thickness direction.

2. The optical member according to claim 1, wherein the refractive index of the transparent resin material is smaller than the refractive index of the material constituting the base member.

3. The optical member according to claim 1, wherein the transparent resin material contains pentaerythritol triacrylate.

4. An image pickup apparatus comprising:
the optical member according to claim 1; and
an image pickup element to pick up an image passed through the optical member.

5. The image pickup apparatus according to claim 4, wherein in the optical member, the base member and the porous layer are arranged in that order from the side of the image pickup element.

6. The optical member according claim 1, the porous structure of the porous glass is a spinodal type structure.

7. An optical member comprising:
a base member; and
a porous layer disposed on the base member, comprising a porous glass and a transparent material held in the inside of a porous structure of the porous glass,
wherein, in the thickness direction of the porous layer, the content of the transparent material in the base member side with respect to the center line of the porous layer in the thickness direction is larger than the content of the transparent material in the side opposite to the base member with respect to the center line of the porous layer in the thickness direction; and
wherein the porous structure is a spinodal type structure.

8. The optical member according to claim 7, wherein the transport material is a resin.

9. An optical member comprising:
a base member; and
a porous layer disposed on the base member, comprising a porous glass and a transparent material held in the inside of a porous structure of the porous glass,
wherein, in the thickness direction of the porous layer, the content of carbon in the base member side with respect to the center line of the porous layer in the thickness direction is larger than the content of carbon in the side opposite to the base member with respect to the center line of the porous layer in the thickness direction.

10. The optical member according to claim 9, wherein the transport material is a resin.

* * * * *